Dec. 12, 1967      L. L. MARRAFFINO      3,357,647
SPRAY HEAD
Filed April 1, 1966      2 Sheets-Sheet 1
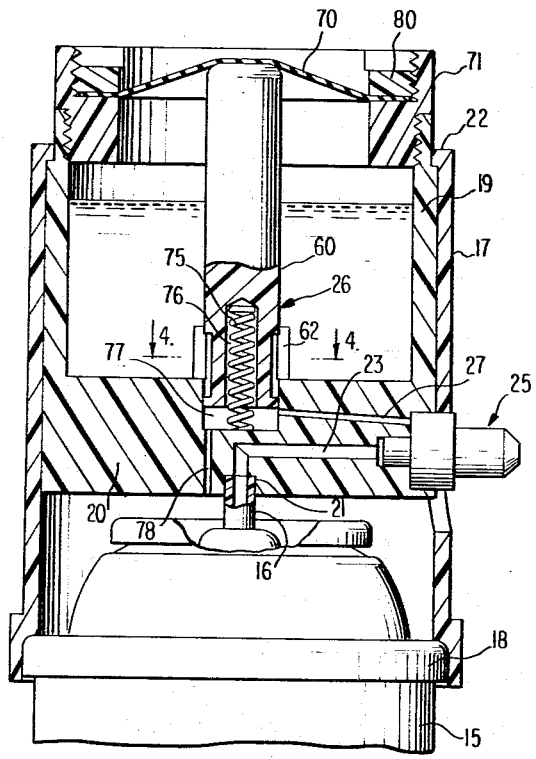
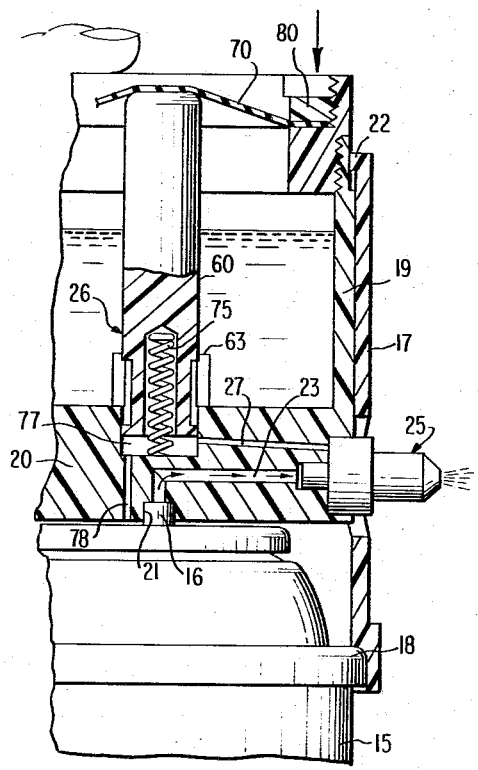
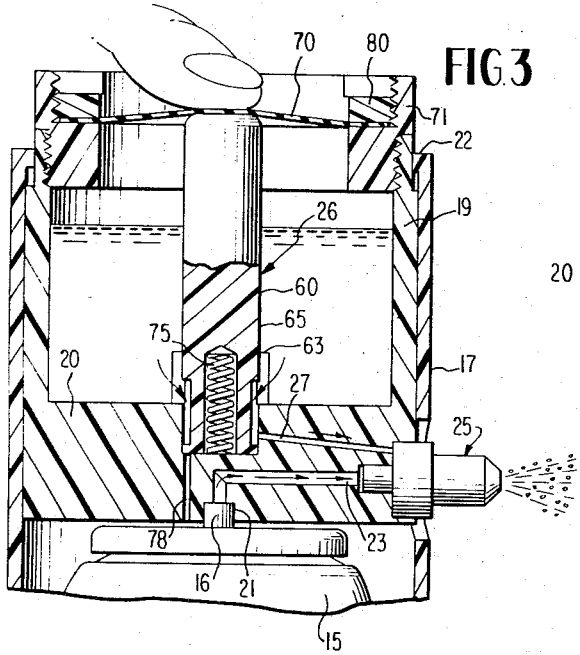
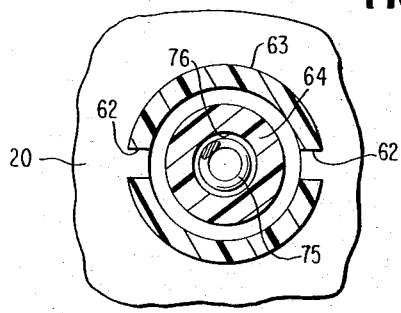
INVENTOR
LEONARD L. MARRAFFINO
BY Wynne & Finken
ATTORNEY Dec. 12, 1967  L. L. MARRAFFINO  3,357,647
SPRAY HEAD Filed April 1, 1966  2 Sheets-Sheet 2

INVENTOR
LEONARD L. MARRAFFINO

BY *Wynne + Fisken*

ATTORNEY

United States Patent Office 3,357,647
Patented Dec. 12, 1967

3,357,647
SPRAY HEAD
Leonard L. Marraffino, 1824 NW. 36th Court,
Oakland Park, Fort Lauderdale, Fla. 33309
Filed Apr. 1, 1966, Ser. No. 539,390
7 Claims. (Cl. 239—304)

This invention relates to a spray head for mixing a deodorant fluid with a highly corrosive anti-perspirant fluid.

This invention is directed to a spray head which accurately meters the required minute quantity of an anti-perspirant fluid into a spray stream of deodorant fluid dispensed from an aerosol container. It will be recognized that a major problem in packaging a product of this type is the superior structural integrity required for shipment and storage coupled with equal structural integrity during its period of intermittent use which may be for a matter of weeks. The highly corrosive anti-perspirant fluid must not leak during shipment and storage and provision must be made to insure no leakage during use. The use of metal is restricted to parts not in contact with the corrosive fluid and in this invention the reliable characteristics of a steel coil spring are utilized to insure fluid tight sealing, the spring being housed in a chamber sealed from the corrosive fluid.

The spray head involves a non-metallic outer holder in which a non-metallic tank is mounted for reciprocation to actuate the container nozzle for release of the deodorant propellant fluid. This fluid is conducted substantially horizontally outwardly to a non-metallic jet means where it passes through a jet orifice, producing a high velocity spray stream which passes through an entrainment zone to ultimate discharge. If desired, a valve means in the tank is actuated upon downward movement of the tank to release the highly corrosive anti-perspirant additive fluid. This additive fluid flows through an additive duct in the base of the tank to a vertical annular sump. The power produced at the entrainment zone draws the additive fluid from the sump through a bleed duct of extremely minute transverse cross section, to accomplish a metering control of the high viscosity additive fluid. Following passage through this metering bleed duct, the additive fluid passes into an annular delivery chamber for ultimate entrainment with the high velocity spray stream in the entrainment zone. Turbulent mixing occurs and a well-mixed spray is discharged. When the unit is not in use, the highly corrosive additive fluid remaining in the entrainment zone is an insignificant amount and can dwell there. The fluid remaining in the bleed duct through capillary action may return to the annular sump. A safety air inlet is provided at the upstream end of the additive duct to prevent an air lock in the additive fluid flow path.

These and further objects and advantages of the present invention will become more apparent upon reference to the following specification, appended claims and drawings wherein:

FIG. 1 is a vertical cross sectional view of the spray head in fully closed condition mounted on an aerosol container;

FIG. 2 is a view similar to FIG. 1 with the tank depressed to release propellant fluid from the aerosol container;

FIG. 3 is a view similar to FIG. 1 with the tank and the piston depressed to release both fluids;

FIG. 4 is a view taken on line 4—4 of FIG. 1;

Figure 5:
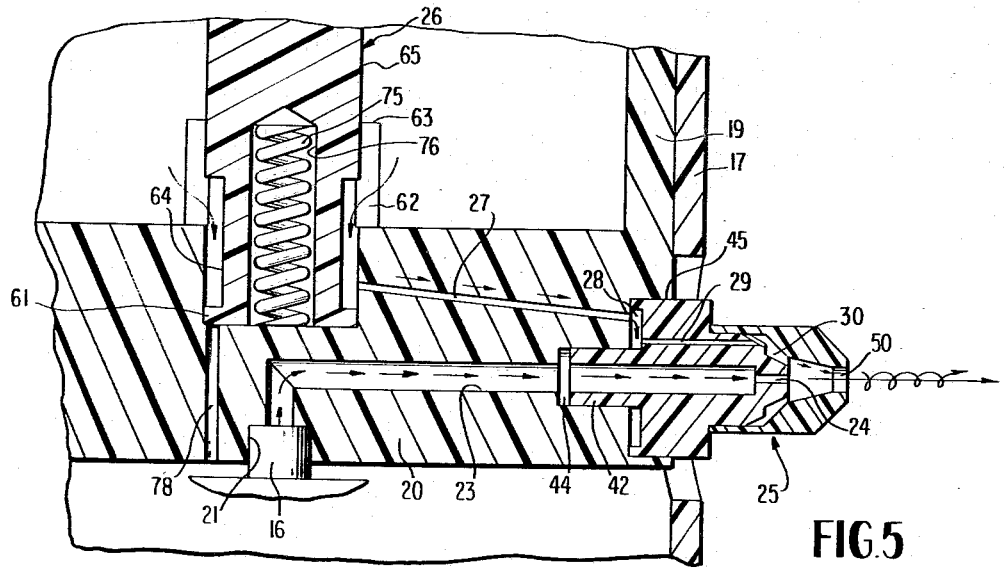
FIG. 5 is an enlarged vertical cross sectional view of the key elements in the depressed condition of FIG. 4.

The aerosol container 15 has a container nozzle 16 which upon downward actuation releases a deodorant propellant fluid. A holder 17 is clamped at its lower portion to the rim 18 of the container 15 and provides a bearing for vertical movement of a tank 19 which has a base 20 with an inlet 21 for snugly receiving the container nozzle 16. An upper rim 22 on the holder 17 limits the upward movement of the tank 19. The spray head may be merchandised mounted on the container or as a separate item. The tank 19 is shown in FIG. 1 in its normal closed upper position, being biased to this position by the container nozzle 16. A propellant duct 23 extends horizontally outwardly from the inlet 21 and terminates at the jet orifice 24 of the jet means 25, the jet orifice having a cross sectional area equal to a hole having a diameter of about .015 inch.

The tank has valve means 26 for releasing the additive fluid into an additive duct 27 which extends horizontally outwardly above the propellant duct 23 to said jet means 25 where, in downstream progressive fluid communication, it passes (FIG. 5) from the additive duct 27 into a vertical annular sump 28, a bleed duct 29, and a horizontally disposed frusto-conical delivery chamber 30 which surrounds the jet orifice 24. Through the entrainment action, a flowing sheath of additive fluid is formed around the internal spray stream of propellant fluid. The propellant duct 23, additive duct 27, sump 28 and delivery chamber 30 are dimensioned to provide for normal fluid flow of the fluids involved. The jet orifice 24, however, is very small to produce a high viscosity spray stream. The bleed duct 29 which acts as a safety feature as well as a control means is dimensioned to provide for substantially capillary flow which, of course, is expedited through the entrainment force produced by the jet orifice 24. The bleed duct has a cross sectional area equal to a hole having a diameter of about .001 to .015 inch.

Figure 6:
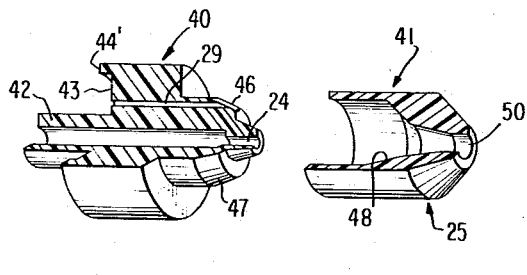
FIG. 6 is an exploded perspective view in section of the jet means.

The invention provides a device which can be manufactured at the required low cost by the provision of a jet means 25 which includes a first member 40 and a second member 41 as seen in FIG. 6. Molding the jet means 25 as an integral part of the base and the necessary machining thereof to produce the minute orifices and bleed ducts required would make the cost prohibitive for the intended use. The holes in the first member 40 for producing the bleed duct 29 and the jet orifice 24 require special consideration which can be economically provided through the utilization of the several parts.

The first member 40 of the jet means 25 includes the terminal portion 42 of the propellant duct 23 and has a vertical annular wall 43 therearound which cooperates with the base 20 to form the annular sump 28. The horizontally extending pipe or terminal portion 42 is tightly received within the central hole 44 in the base and the vertical annular wall 43 is provided with an inwardly extending peripheral flange 44 which abuts the vertical face of the countersunk hole 45 in the base to form therewith the annular sump 28. The additive duct 27 terminates at the base 20 at a position adjacent the top of the sump 28 and the bleed duct 29 extends substantially horizontally through the first member 40 below the termination of the additive duct 27 and above the terminal portion 42 of the propellant duct 23, the bleed duct 29 at its terminal end portion being defined by a slot 46 in the annular tapered forward portion 47 of the first member 40 which is closed or covered by a cooperating inner annular surface 48 of the second member 41. The bleed duct 29 feeds into frusto-conical delivery chamber 30 which is formed by the second member 41 and the first member 40 around the jet orifice 24, the second member having a discharge outlet 50 aligned with said jet orifice 24.

Deodorant propellant fluid may be separately discharged (FIG. 2) by downward movement of the tank 19 to actuate container nozzle 16. Anti-perspirant additive fluid may be added to this stream (FIG. 3), if desired, by depression of the piston 60 to move its annular seal member 61 downwardly below the inlet to the additive duct 27, additive fluid then flowing through slots 62 (FIG. 4) in the upper portion of the bearing socket 63 through the undercut or small diameter portion 64 of the piston 60 and into the additive duct 27. The annular seal member 61 and the upper shaft portion 65 of the piston 60 provide a sound sliding engagement with the bearing socket 63 and insure an effective wiping seal of the seal member 61 with the socket. The tank 19 has flexible top 70 which, as shown, includes a threaded outer ring 71 for liquid sealing threaded attachment to the cylindrical side wall of the tank. The circular flexible top 70 is sealed to the outer ring 71 by inner ring 80 which threads into the top of the outer ring and clamps the top 70 into a sealed position. The piston 60 is biased upwardly by a metallic coil spring 75 housed at its upper portion in a vertical spring receiving chamber 76 in the bottom of the piston and seated at its bottom on the base. The piston is normally biased upwardly to flex the flexible top 70 outwardly; to release additive fluid, the piston 60 is pressed downwardly against the spring 75. The bearing socket 63 and the annular seal member 61 define a chamber 77 which is sealed from the highly corrosive additive fluid. An air inlet 78 in the base connects chamber 77 with the outside and prevents the formation of an air lock in the additive duct.

While the invention has been described with reference to certain embodiments, they are to be considered illustrative rather than limiting, and it is intended to cover all further embodiments that fall within the spirit and scope of the appended claims.

What is claimed is:

1. A spray head for containing a corrosive anti-perspirant additive fluid and adapted for use with an aerosol container of deodorant propellant fluid whereby upon actuation of the container nozzle, anti-perspirant additive fluid may be entrained with the spray of deodorant propellant fluid, said spray head comprising an outer holder adapted for attachment to said container and a tank having a base with an inlet for snugly receiving said container nozzle, said tank being mounted in said holder for movement from a normal closed up position to a down position against the upward bias of the container nozzle for releasing propellant fluid, said base having a jet means and a propellant duct extending horizontally outwardly from said inlet and terminating at a jet orifice in said jet means, said tank having valve means for releasing said additive fluid, said base having an additive duct extending horizontally outwardly from said valve means to said jet means and in downstream progressive fluid communication with said additive duct, a vertical annular sump, a bleed duct and a horizontally-disposed frusto-conical delivery chamber surrounding said jet orifice for initial entrainment of said additive fluid as a flowing sheath around an internal spray stream of propellant fluid.

2. A spray head as defined in claim 1 and wherein said valve means includes a bearing socket in the top of said base and a piston mounted for reciprocating movement in said bearing socket, said piston having an annular seal member at its lower portion in wiping fluid sealing relationship with said socket for movement to a sealing position above said additive duct and an additive fluid releasing position below said additive duct.

3. A spray head as defined in claim 2 and wherein said tank has a liquid sealing flexible top and wherein said piston extends upwardly into contact with said top to enable selective actuation thereof without destroying the liquid seal of said top.

4. A spray head as defined in claim 3 and wherein said valve means includes a metal spring, said piston having a bottom chamber housing said spring.

5. A spray head as defined in claim 4 and wherein said base includes an air inlet to said bearing socket to prevent an air lock in said additive duct.

6. A spray head as defined in claim 1 and wherein said propellant duct, said additive duct, said sump and said delivery chamber are dimensioned to provide for normal fluid flow, said jet orifice being .015 inch in diameter, and said bleed duct being dimensioned to provide for capillary flow.

7. A spray head as defined in claim 5 and wherein said jet means includes a first member having the terminal portion of the propellant duct formed therein and having an annular vertical wall therearound cooperating with said base to form said annular sump, said additive duct terminating at the base at the top of said sump, said bleed duct extending substantially horizontally through said first member below the termination of the additive duct and above said terminal portion of said propellant duct, said first member having an annular tapered forward portion with a slot therein, said jet means including a second member having a discharge outlet aligned with said jet orifice and having an inner annular surface engaging said forward portion and covering the slot thereby providing the terminal portion of the bleed duct, said discharge outlet spaced from and surrounding said jet orifice and providing therewith said delivery chamber.

References Cited
UNITED STATES PATENTS 3,291,346  12/1966  Marraffino _____ 222—136
3,335,961   8/1967  Marraffino _____ 239—307 X M. HENSON WOOD, Jr., *Primary Examiner.*

M. MAR, *Assistant Examiner.*